April 4, 1944.  L. W. BROOKS  2,345,789
JACK-LIKE SUPPORT FOR LOADING, HAULING AND DUMPING APPARATUS
Original Filed April 10, 1940
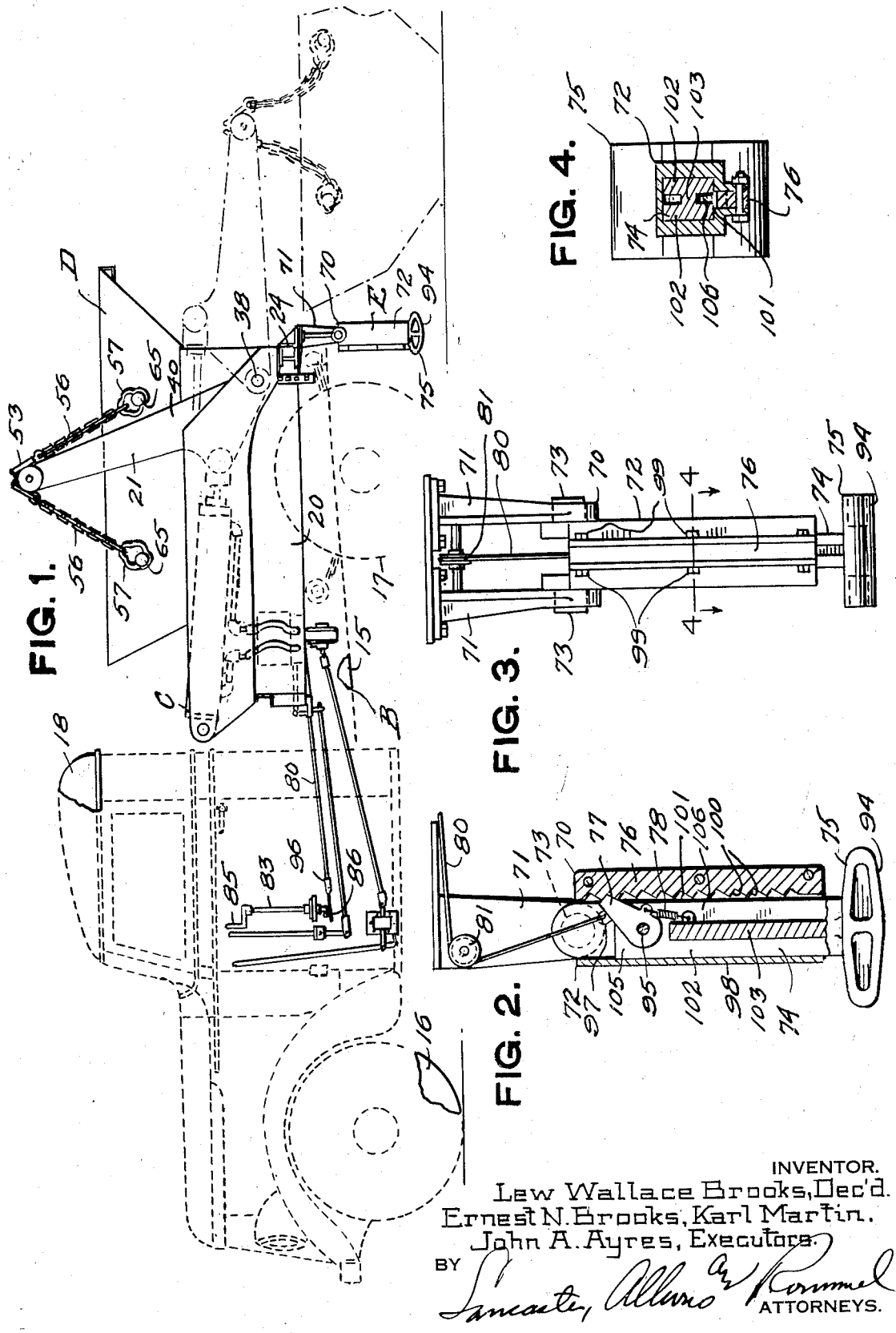
INVENTOR.
Lew Wallace Brooks, Dec'd.
Ernest N. Brooks, Karl Martin,
John A. Ayres, Executors.
BY
ATTORNEYS.

Patented Apr. 4, 1944

2,345,789

UNITED STATES PATENT OFFICE 2,345,789

JACKLIKE SUPPORT FOR LOADING, HAULING, AND DUMPING APPARATUS

Lew Wallace Brooks, deceased, late of Knoxville, Tenn., by Ernest N. Brooks, Karl Martin, and John A. Ayres, executors, all of Knoxville, Tenn., assignors to Brooks Equipment and Mfg. Co., Knoxville, Tenn., a corporation of Tennessee Original application April 10, 1940, Serial No. 328,955. Divided and this application March 6, 1943, Serial No. 478,277

3 Claims. (Cl. 214—77)

The present invention relates to jack-like supports for loading, hauling and dumping equipment, and this application is a division of an application for United States patent on such apparatus filed by Lew Wallace Brooks, April 10, 1940, Serial No. 328,955, now Patent No. 2,313,514, granted March 9, 1943.

In said application is disclosed material handling apparatus wherein a single vehicle provided with a hoist mechanism is adapted for economical loading at the rear portion of the vehicle and selectively dumping, or unloading without dumping, at the rear portion of the vehicle, skips, buckets, or other apparatus of a nature suitable for the transportation and delivery of miscellaneous material.

A primary object of the present invention is to provide an improved jack-like support for relieving the vehicle chassis from extreme overhung load when the skip or bucket is being raised from or lowered to the ground, and which also eliminates the necessity for counterweights upon the front portion of the vehicle.

Another object of the invention is to provide a vehicle carried jack-like support which may be lowered with ease, preferably prior to lifting of the load, either to place it on the vehicle or to deliver it at its destination, so as to engage the ground, and which may be easily lifted from ground engagement when it has served its purpose as a strut between the vehicle body and the ground.

Another object of the invention is to provide a jack-like support that is sturdy, compact, easily manufactured and so constructed that parts which may be subject to wear may be readily replaced if worn or broken.

Other objects and advantages of the invention will appear in the following detailed description of the preferred embodiment of the invention, taken in connection with the accompanying drawing forming a part of this specification, and in which drawing:

Figure 1 is a side elevation of portions of suitable loading, hauling and dumping mechanism, showing the hoist structure on the truck chassis, the bucket in carrying position on the chassis, and the jack-like support in readiness to be lowered for ground engagement.

Figure 2 is an enlarged vertical section thru the jack leg assembly.

Figure 3 is a rear elevation of the jack-like support assembly.

Figure 4 is a horizontal section on the line 4—4 of Figure 3.

In the drawing, a suitable truck B is disclosed, supporting a load or bucket handling unit C, a bucket or load D and a jack-like support E.

The truck B may be of any preferred type and in the example shown includes the chassis 15 having front running gear 16 and rear running gear 17, with an engine forward of the cab structure 18 above the front running gear. The usual drive is provided between the engine and the rear running gear, and a suitable power take-off is associated with this drive for operating the mechanism C.

The load or bucket handling unit C, is shown as including a sub-frame 20 upon which is mounted hydraulic hoist means 21 having detachable connection with the bucket D. The sub-frame 20 is mounted upon the truck chassis 15 rearwardly of the cab 18 with the rear end of the sub-frame substantially aligning with the rear end of the chassis.

The hoist means 21 is shown as including a boom 40 pivotally mounted on a shaft 38 and adapted to be swung to various positions to extend above the chassis 15 and to the rear of the chassis as indicated by full and dotted lines in Figure 1. This boom is shown connected to the bucket D by means of a pivoted saddle 53 at the free end of the boom, chains 56, and key plates 57 detachably engaging headed lugs 65 on the bucket D.

The jack-like support E is primarily for the purpose of relieving load strains on the vehicle chassis during the placing of the loaded bucket on the chassis and the delivery of it at its destination, altho it may be also brought into use if desired when dumping the load from the bucket such as in the manner disclosed in the aforesaid application Serial No. 328,955. It includes a jack-like support structure 70 mounted beneath the rear portion of the truck chassis, to swing in a vertical plane longitudinally of the truck. It preferably comprises a pair of brackets 71 secured to and depending from suitable cross bracing 24 of the chassis 15; a vertical housing 72 pivoted at its upper end, as by trunnions 73, to the lower ends of brackets 71 and including a ratchet bar 76; a vertical support bar 74 slidably mounted in the housing 72; a base or foot 75 at the lower end of bar 74; the base or foot having a rounded bottom surface 94 arcuated in a direction in which the housing 72 may be swung; a pawl 77 pivoted as at 95 in the upper portion of the support bar 74 and extending upwardly and diagonally from pivot 95 for coacting with the ratchet bar 76 for retaining the support bar 74 extended; and a coil spring 78 normally urging the pawl 77 into engagement with the ratchet bar 76.

Suitable means 96 is provided for operating the jack-like support E from the cab 18 and in the example shown, comprises a cable 80 connected at one end to the upper portion of pawl 77 as at 97, then extends upwardly and is trained about a sheave 81, supported by the brackets 71, from which it extends forwardly beneath the sub-frame 20 to a location beneath the floor of the truck cab 18 where it is connected to an arm 86 at the lower end of a vertical crank shaft 83 having a handle 85 convenient for operation by the driver or attendant of the truck.

The housing 72 preferably comprises the ratchet bar 76 and an upright, tubular, vertically slotted, main body portion 98, the bar 76 fitting the slot of the body portion and detachably held in place as by suitable fastening means 99, such as bolts. The ratchet teeth 100 of the bar 76 confront the vertical way 101 in the tubular body portion 98.

Thus the ratchet bar 75 and main body portion 98 may be made of metal suitable to sustain the load coming upon them, and the ratchet bar may be separately hardened so as to withstand considerable frictional contact between the pawl 77 and the bar teeth 100.

The support bar 74 is preferably of substantially H-shape cross section throughout the major portion of its length as shown in Figures 3 and 4, comprising parallel side flanges 102 and a web 103 terminating short of the upper end 104 of the bar 74 providing a cavity 105 for the pawl 77 and a channel 106 nearest the ratchet bar 76 for accommodation of the spring 78.

In operation of the apparatus, a plurality of the buckets D may be employed and may be loaded at convenient points with material to be transported. With the loaded bucket resting on the ground, as shown by dotted lines in Figure 1, the truck is backed up and the booms 40 lowered so that the key plates 57 on the chains 56 may be engaged over the headed lugs 65 on opposite side walls of the bucket. The truck driver then rotates the control shaft 83 by means of the crank handle 85 and swings the crank arm 86 to a rearward position which slackens the cable 80 and allows the support bar 74 of the jack-like support 70 to lower by its own weight within the housing 72 until the foot or base 75 engages the ground surface. When the cable 80 is thus slackened, the spring 78 engages the pawl 77 with the ratchet 76 and the jack-like support forms a column or strut supporting the rear end of the truck and acts as a fulcrum about which the load can be raised or lowered. This controlled supporting column or strut behind the rear running gear of the truck tends to retain the front end of the truck from raising up from the ground and also decreases the load strain on the rear truck springs. The operator now operates the bucket handling unit C, raising the booms 40 whereby the bucket will be raised to a loaded or carrying position resting directly upon the sub-frame 20, as shown in Figure 1.

When the loaded bucket has been deposited upon the sub-frame 20, this additional weight upon the truck keeps compressive stress on the jack-like support 70. In order to transfer this stress from the jack-like support to the rear truck springs, the truck is moved forward whereupon the housing 72 pivots in the brackets 71 and the base of the bar 74 rolls on its rounded lower surface 94, thus relieving any supporting action by the jack-like support. With the load thus removed from the jack-like support, the crank arm 86 of the control shaft 83 is swung to a forward position and exerts a pull on the cable 80 which draws the pawl 77 out of engagement with the ratchet 76 and raises the bar 74 within the housing 72.

When desiring to lower a loaded bucket from the truck without dumping, the bar 74 is lowered so that the jack-like support acts as a strut between the rear end of the truck and the ground, in the same manner as it is employed when raising a loaded bucket to carrying position on the truck.

What is claimed is:

1. In load handling apparatus, a truck, a jack-like support, and means pivotally connecting said support to an end portion of the truck so as to depend therefrom and be limited to swinging movement only in a vertical plane extending longitudinally of the truck, said jack-like support comprising, a housing member and a support bar member in telescopic relation, one of which is pivoted to the truck and the other movable toward and from the ground, means for retaining said housing and support bar members in various extended and retracted positions, and a foot on the lower portion of the said member which is movable toward and from the ground, said foot having a rounded bottom surface, arcuate in the direction in which the jack-like support may swing.

2. In a jack-like support assembly for load handling trucks, the combination of a housing comprising a ratchet bar, an upright, tubular, vertically slotted main body portion with the ratchet bar fitting the slot of said body portion and the teeth of the ratchet bar confronting the way of the body portion, and means detachably securing said ratchet bar in said slot; and a vertical support bar slidable in the way of said housing and provided with a pivoted pawl for engagement with the teeth of said ratchet bar.

3. In a jack-like support assembly for load handling trucks, the combination of a housing provided with a vertical way of substantially rectangular cross-section and ratchet teeth confronting said way, a vertical support bar slidable in said way, said bar of substantially H-cross section throughout the major portion of its length, so as to provide parallel side flanges, a web therebetween terminating short of the upper end of the bar, a cavity at the upper portion of the bar and a channel nearest said ratchet teeth, a pawl pivotally mounted in said cavity for coaction with said ratchet teeth, and a spring engaging said support bar and said pawl, normally urging the latter into engagement with said ratchet teeth, said spring being in part at least, accommodated in said channel of the support bar.

ERNEST N. BROOKS,
KARL MARTIN,
JOHN A. AYRES,
*Executors of the Estate of Lew Wallace Brooks, Deceased.*